US011945220B2

(12) United States Patent
Kew et al.

(10) Patent No.: US 11,945,220 B2
(45) Date of Patent: Apr. 2, 2024

(54) METHOD AND APPARATUS FOR DISPENSING LIQUID DROPLETS

(71) Applicant: Jetronica Limited, Blackburn (GB)

(72) Inventors: Simon Kew, Preston (GB); Alan Hudd, Preston (GB); Thomas Blythe, Preston (GB); Andi Tao, Shanghai (CN); Albert Kocsis, Budapest (HU)

(73) Assignee: Jetronica Limited, Blackburn (GB)

( * ) Notice: Subject to any disclaimer, the term of this patent is extended or adjusted under 35 U.S.C. 154(b) by 0 days.

(21) Appl. No.: 17/770,522

(22) PCT Filed: Oct. 29, 2020

(86) PCT No.: PCT/GB2020/052733
§ 371 (c)(1),
(2) Date: Apr. 20, 2022

(87) PCT Pub. No.: WO2021/084254
PCT Pub. Date: May 6, 2021

(65) Prior Publication Data

US 2022/0388304 A1 Dec. 8, 2022

(30) Foreign Application Priority Data

Nov. 1, 2019 (GB) ...................................... 1915906

(51) Int. Cl.
*B41J 2/14* (2006.01)
*B41J 2/21* (2006.01)

(52) U.S. Cl.
CPC ......... *B41J 2/14201* (2013.01); *B41J 2/2121* (2013.01); *B41J 2/1429* (2013.01); *B41J 2202/05* (2013.01); *B41J 2202/12* (2013.01)

(58) Field of Classification Search
CPC ........ B41J 2/142; B41J 2/2121; B41J 2/1429; B41J 2202/05; B41J 2202/12
See application file for complete search history.

(56) References Cited

U.S. PATENT DOCUMENTS 5,598,200 A 1/1997 Gore
5,798,774 A * 8/1998 Okada .................... B41J 2/1607 347/70

(Continued)

FOREIGN PATENT DOCUMENTS

EP 0159188 A2 10/1985
EP 1004441 A2 5/2000

(Continued)

OTHER PUBLICATIONS

Written Opinion and International Search Report of corresponding application No. PCT/GB2020/052733 dated Feb. 4, 2021.

(Continued)

*Primary Examiner* — Geoffrey S Mruk
(74) *Attorney, Agent, or Firm* — Vorys, Sater, Seymour and Pease, LLP

(57) ABSTRACT

A liquid dispensing element is provided. The element comprising; a dispensing plate comprising a plurality of orifices; the dispensing plate at least partially defining a fluid flow path; a plurality of piezoelectric transducers each comprising a piston configured to move perpendicular to the dispensing plate between a first position wherein the piston is close to the dispensing plate and a second position wherein the piston is further from the dispensing plate. The movement between the first and second positions results in the ejection of a droplet of fluid via a surface cavitation droplet ejection process such that the diameter of the droplet is less than a diameter of the orifice.

15 Claims, 7 Drawing Sheets

(56) References Cited

U.S. PATENT DOCUMENTS

| | | | | |
|---|---|---|---|---|
| 6,273,552 | B1 | 8/2001 | Hawkins et al. | |
| 6,851,587 | B1 | 2/2005 | Tseng | |
| 9,440,781 | B2 * | 9/2016 | Ikushima | B65D 83/0022 |

FOREIGN PATENT DOCUMENTS

| | | | |
|---|---|---|---|
| EP | 2732883 | A1 | 5/2014 |
| FR | 2743019 | A | 7/1997 |
| GB | 2529511 | A | 2/2016 |
| JP | S6285948 | A | 4/1987 |
| JP | H05116284 | A | 5/1993 |

OTHER PUBLICATIONS

Combined Search and Examination report of corresponding application No. GB1915906.0 dated May 4, 2020.

* cited by examiner

METHOD AND APPARATUS FOR DISPENSING LIQUID DROPLETS

This invention relates to method and apparatus for dispensing liquid droplets.

It is known in the art to dispense droplets through a nozzle. A large variety of apparatuses for doing so can be found in the field of inkjet printers.

Dispensing of fluids for coating and digital imaging applications is achieved using a variety of technologies, which typically impart energy to a fluid in a confined volume to cause the ejection of a droplet from a nozzle. Drop-on-demand (DOD) inkjet is a well-established technique for achieving high-resolution printing using a piezoelectric element to generate a pressure wave in a confined chamber that ejects a droplet of several picolitres in volume. Inkjet printheads are typically designed with a high density of piezoelectric dispensing elements to achieve native print resolutions of 300-600 dots per inch (DPI). The printhead construction is highly complex and includes micro-machined fluid pathways, laser drilled nozzles and complex assemblies. Inkjet printheads are typically non-refurbishable owing to the design of the fluid flow path and integration of the piezoelectric element. In addition, the high level of engineering complexity ensures that industrial inkjet is a relatively high cost printing technology.

Typically, the droplet size is determined by the nozzle diameter and that the droplet diameter is typically larger than the orifice. Therefore, in order to achieve high resolution printing, nozzle diameters are typically found to be less than 50 microns and most preferably 25 microns or less. In addition, the nozzle can be actuated at frequencies in the region of 50 kHz to deliver high resolution at high throughput. This places significant restrictions on the fluids that can be used, such that only fluids of viscosity lower than 10 cPoise can be dispensed and solid particles must not exceed 1 μm in diameter. Furthermore, such low nozzle diameters mean that the orifice is highly sensitive to fluid evaporation, which can occlude the nozzle and may ultimately cause the printhead to fail.

Alternatively, piezoelectric jetting valves are well known as single unit dispensers for a much wider range of fluid viscosities than drop on demand inkjet. However, these techniques can only deliver low resolution dispensing at low throughput. The dispenser orifice is typically within the range of 500 μm to 1000 μm and the valve can typically only operate up to 100 Hz, which is unsuitable for imaging applications. Piezoelectric jetting valves typically require a footprint which would preclude use in an array for imaging applications.

It is an aim of the present invention to provide a method and apparatus for dispensing small droplets. In particular, it is an aim of the present invention to produce droplets smaller than the smallest size achievable using prior art dispensing apparatuses incorporating nozzles. The method and apparatus of the present invention has particular applicability to the field of printing using ink, as a smaller droplet size enables the production of prints with a higher number of dots per inch (DPI) and so a higher resolution of image may be achieved through a printer incorporating the present invention.

It is a further aim of the present invention to provide reliable utilisation of the method and apparatus of the present invention. In particular, in order to deliver the jetting effect to create droplets smaller than the orifice through which the droplets are dispensed, the apparatus configuration must be finely tuned. Particular attention is paid to the fluid flow path and the piston configuration to facilitate the droplet dispensing.

An acknowledged problem within the piezoelectrically actuated printing systems arises from egress of ink from the intended fluid flow path and corresponding contact with the piezoelectric actuator. This can render the piezoelectric actuator non-functional.

It is against this background that the present invention has arisen.

In accordance with the present invention there is provided a method of dispensing a liquid droplet, the method comprising the steps of: providing a dispensing plate comprising an orifice; providing a piston arranged to be moveable between a first position in which the piston is in proximity to the dispensing plate and a second position in which the piston is spaced apart and further apart from the dispensing plate and covers the orifice; flowing a stream of liquid over the dispensing plate; and moving the piston from the first position to the second position at a sufficient speed to cause a cavitation event to eject a droplet from the orifice, with the droplet having smaller diameter than the orifice and caused by the cavitation event.

Furthermore, in accordance with the present invention there is provided a liquid dispensing element comprising a dispensing plate comprising a plurality of orifices; the dispensing plate at least partially defining a fluid flow path, a plurality of piezoelectric transducers each comprising a piston configured to move perpendicular to the dispensing plate between a first position wherein the piston is in proximity to the dispensing plate and a second position wherein the piston is spaced apart and further from the dispensing plate, wherein each piston is configured, upon actuation by a piezoelectric component, to move between the first and second positions to create a pressure wave directed at a corresponding orifice of the dispensing plate, and to thereby cause a surface cavitation event in a fluid flowing along the fluid path which results in the ejection of a droplet of fluid, the diameter of the droplet being less than a diameter of the orifice.

In a first position the piston may be a distance of 5-500 μm from the plane of the dispensing plate and optimally approximately 10 μm. In a second position the piston may be 5-1000 nm from the first position of the piston but optimally 10 nm. The liquid dispensing element according to any one of the preceding claims wherein the piezoelectric transducer is configured to move the piston at a speed of $10^{-3}$ $ms^{-1}$, but may be in the range $10^{-2}$ $ms^{-1}$ to $10^{-4}$ $ms^{-1}$.

The orifice may have a diameter of 25-150 μm, in particular 100 μm, and the ejected droplet, caused by the cavitation event a diameter of 10 μm. The diameter of the droplet is caused by the cavitation rather than by the size of the orifice.

The piston may contact the stream of liquid in the first position.

The piston may be moved from the first position to the second position to force a droplet of liquid through the orifice using a piezoelectric element. An upper plate may be provided above the dispensing plate to form a channel therebetween, and the step of flowing a stream of liquid over the dispensing plate may comprise flowing the stream of liquid within the channel. The piston may pass through a hole in the upper plate in the first and second positions. A sealing means may be provided between the piston and the upper plate to isolate the stream of liquid from a volume above the upper plate. The sealing means could comprise an o-ring or a rubber grommet.

The liquid could be an ink. An inkjet printer may comprise a dispensing apparatus according to the invention.

Furthermore, according to the present invention there is provided a liquid dispensing element comprising; a dispensing plate comprising a plurality of orifices; the dispensing plate at least partially defining a fluid flow path; a plurality of piezoelectric transducers each comprising a piston configured to move perpendicular to the dispensing plate between a first position wherein the piston is spaced from the dispensing plate and a second position wherein the piston approaches the dispensing plate, wherein the movement between the first and second positions results in the ejection of a droplet of fluid via a surface cavitation droplet ejection process such that the diameter of the droplet is less than a diameter of the orifice.

Each piston may be configured to contact the fluid flow path when it is in the first position. Each piston may be tapered. The tapered format of the piston, which might otherwise be cylindrical, increases the pressure delivered to the nozzle.

The orifices may have a diameter in the range of 25 μm and 150 μm. The orifices may have a diameter in the range of 50 μm to 150 μm, for example 50 μm or 75 μm. The dispensing plate may be metal, for example stainless steel.

The element may further comprise an upper plate provided substantially parallel to the dispensing plate and defining the fluid flow path. The upper plate may comprise a plurality of orifices through which the pistons are configured to pass. The upper plate may be formed from an elastomeric material which may have a thickness in the region of 50 μm to 300 μm, for example 150 μm.

The element may further comprise a seal between each orifice and the corresponding piston. The seal may be an O-ring or a rubber grommet.

An array of liquid dispensing elements as heretofor described may be combined to form a printhead. This system reliably delivers the required mechanical interface between the piezoelectric transducers and the corresponding pistons, together with appropriate management of the fluid. It also enables consistent operation of the printhead through management of the fluid flow.

The upper plate may seal the fluid flow path from the piezoelectric transducers. The provision of a continuous seal between the fluid flow path across the dispensing plate and the piezoelectric transducers is key to protecting the piezoelectric transducers from the fluid. The provision of a continuous seal also improves the consistency of fluid flow by minimising turbulence caused by additional sealing parts. Furthermore, the provision of a consistent seal ensures that there is consistent pressure at each dispensing orifice.

The upper plate may have a series of protrusions configured to engage with the pistons. The protrusions ensure consistent transfer of the mechanical energy from the piezoelectric transducers, via the pistons, to the fluid in the fluid flow path. This configuration is advantageous in that it does not require further seals to be provided around each of the pistons because the upper plate is continuous and provides a complete seal.

The upper plate may have a dual-layered construction. The upper plate may comprise a first soft, compliant layer which seals the fluid flow path from the piezoelectric transducers and then one or more further layers that provide the protrusions configured to mate with the pistons. The protrusions may be harder to ensure an efficient transfer of energy from the piston into the fluid flow path to result in the production of the liquid drop.

DETAILED DESCRIPTION

The invention will now be described with reference to the accompanying drawings, in which:

FIG. 1*a* schematically shows a cross-sectional view of a dispensing element according to the present invention with a piston in a first position;

FIG. 1*b* schematically shows a cross-sectional view of a dispensing element according to the present invention with a piston in a second position;

FIG. 2 schematically shows a perspective view of a printhead according to the present invention;

FIG. 3 schematically shows a further view of the printhead shown in FIG. 2;

Figure 1A:
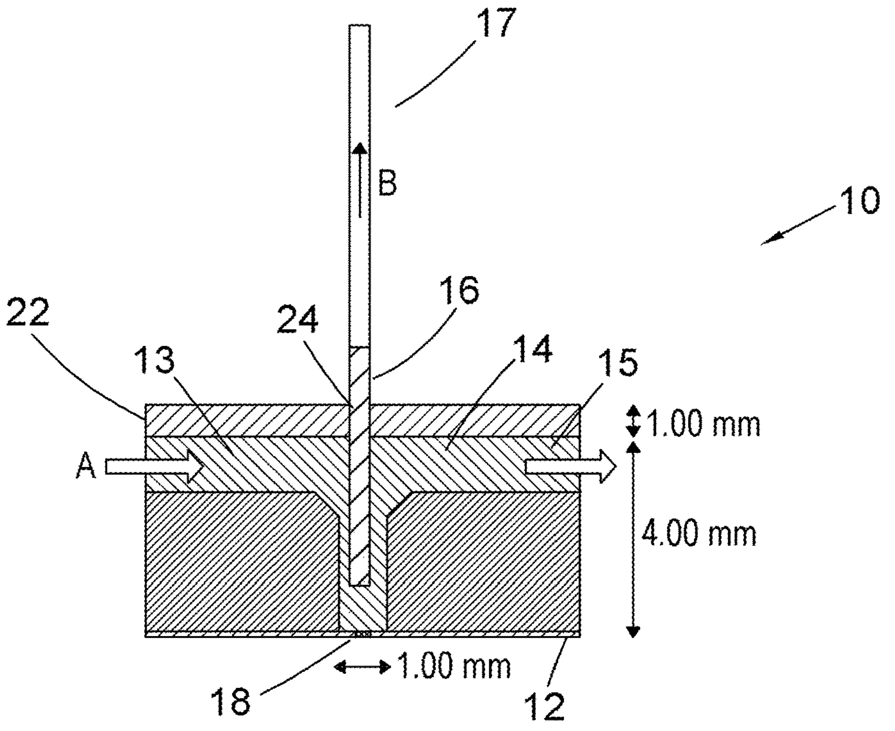

FIG. 1*a* shows a cross-sectional view of a dispensing element 10 according to a first embodiment of the present invention. The dispensing element 10 comprises a dispensing plate 12.

A flow of liquid 14 is maintained on an upper surface of the dispensing plate 12. The dispensing plate 12 thereby partially defines a fluid flow path 13. The liquid 14 is constantly moving in the direction indicated by arrow A. The liquid 14 can be kept in motion by pumping the liquid across the dispensing plate 12, or using the force of gravity, or by any other suitable process as is well known in the art.

Figure 1B:
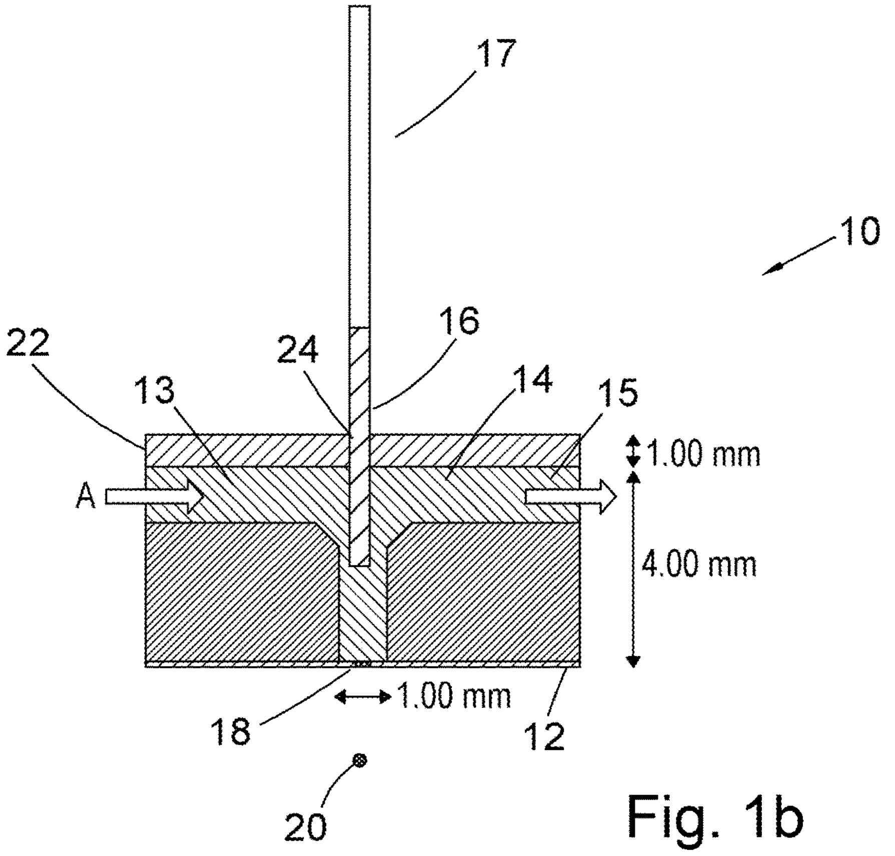

A piston 16 is suspended above the dispensing plate 12 in a first position. The piston 16 is preferably held close to the dispensing plate 12. For example, as shown in FIG. 1*a* the piston 16 may contact the liquid 14 above the dispensing plate 12 in a first position. The piston 16 is arranged to move from this first, proximal position in a direction indicated by the arrow B to a second position, spaced apart from the dispensing plate 12 as shown in FIG. 1*b*. When the piston 16 moves further from the dispensing plate 12, it moves to a position that is in the region of 300 μm away from the dispensing plate 12. For example it may move from within 100 μm of the dispensing plate in a first position to a second position in a region of 300 μm from the dispensing. The choice of distance of movement of the piston from the dispensing plate 12 is balanced with the selection of the piezoelectric actuation. The force provided by the piezoelectric actuator will be greater if the distance of the first position from the dispensing plate 12 is greater. If the distance between the first position of the piston and the dispensing plate 12 is very small, then a reduced force on the piezoelectric actuator may still provide sufficient force to result in the ejection of a droplet of fluid through the orifice.

A dispensing orifice 18 is present in the dispensing plate 12. As shown in FIGS. 1*a* and 1*b*, the piston 16 lies directly over the dispensing orifice 18 when the dispensing element 10 is fully assembled. The dispensing orifice 18 can by punched or drilled into the dispensing plate 12, or can be formed by any other suitable process as is well known in the art.

With the piston 16 in its first position, the liquid 14 does not enter or pass through the dispensing orifice 18 due to its inertia.

When it is desired to dispense a droplet of liquid from the dispensing element 10, the piston 16 is moved to its second position in which the piston 16 moves away from the dispensing plate 12. The piston 16 is moved to its second position using a piezoelectric transducer 17. The movement of the piston in the direction of the arrow B causes a negative pressure in the region of the dispensing orifice 18, where the liquid flow not only moves in a lateral direction but is also pushed towards the dispensing orifice 18. This negative pressure causes the liquid to overcome the surface tension of the liquid 14 adjacent to the dispensing orifice 18.

Consequently, the meniscus formed adjacent to the dispensing orifice 18 is broken and a droplet of liquid is forced through the dispensing orifice, as illustrated at item 20 (in FIG. 1*b*). This occurs via a surface cavitation process resulting in the ejection of a droplet that has a diameter smaller than the diameter of the orifice 18 through which it is dispensed. As a result of the use of a surface cavitation process, the droplet size is independent of the size of the orifice through which it is dispensed. The diameter of the droplet can therefore be selected to be smaller than the orifice, thereby simplifying the manufacture of the device as the orifices and corresponding flow pathways smaller than the droplets to be dispensed are no longer required.

The droplet ejection mechanism relies on a piston displacement in close proximity to the dispensing orifice 18, which creates a directional pressure wave that results in the creation of a droplet. The mechanism underpinning this effect is different from conventional drop-on-demand inkjet wherein a non-directional pressure wave is generated in a dispensing volume adjacent to the dispense orifice. The jetting mechanism reported is based on stimulated surface cavitation phenomena.

It is known that when solid objects are dropped onto a liquid surface a jet opposite to the momentum of the object can be formed. These are so-called "Worthington Jets".

This mechanism, which has been characterized and modelled in detail (Ref Phys. Rev. Lett. 102, 034502—Published 23 Jan. 2009) explains the observation of jetting as the result of cavitation-implosion processes near to the surface. Cavities collapse to create a jet in the opposite direction to the momentum of the solid object.

Our jetting principle also involves the generation of cavitation phenomena at the fluid surface, which generates a fluid jetting process and causes ejection of well-defined droplets from the fluid meniscus. The piezo-actuated formation of "Jetting Cavities" underpins our approach to droplet formation, wherein the dimensions of the cavity govern the droplet volume rather than the dimensions of the dispense orifice, as per conventional drop-on-demand inkjet.

Although the dispensing element illustrated in FIGS. 1*a* and 1*b* include a single piston and single orifice, it will be understood that a plurality of these are combined to form an array.

The selection of the separation of adjacent pistons within the array is influenced by several factors, including the requirement to avoid 'crosstalk' between one piston and an adjacent piston. Provided that the separation of the pistons is sufficient that the disruption to the liquid flow caused by a first piston is trivial once the liquid has travelled a further predetermined threshold distance.

The piston 16 passes through a hole in the upper plate 22 as shown, with a sealing means 24 forming a seal between the fluid flow path 14 and a volume above the upper plate 22. The sealing means 24 may comprise, for example, a sealing ring, such as an o-ring, or a rubber grommet.

This arrangement has the beneficial effect that items located in the volume above the upper plate 22 are isolated from the liquid 14. This can be useful in protecting sensitive components (for example, electronics, such as piezoelectric transducer 17) which may be damaged by exposure to liquids. This arrangement also has the beneficial effect that the liquid 14 is constrained to a channel 15, which allows the pressure of the liquid flow to be better monitored and controlled, compared to arrangements in which the liquid flow traverses across an open surface. This arrangement also decreases the rate at which the liquid flow dries out. This can be particularly desirable where the liquid used is a quick-drying liquid, such as ink.

Figure 2:
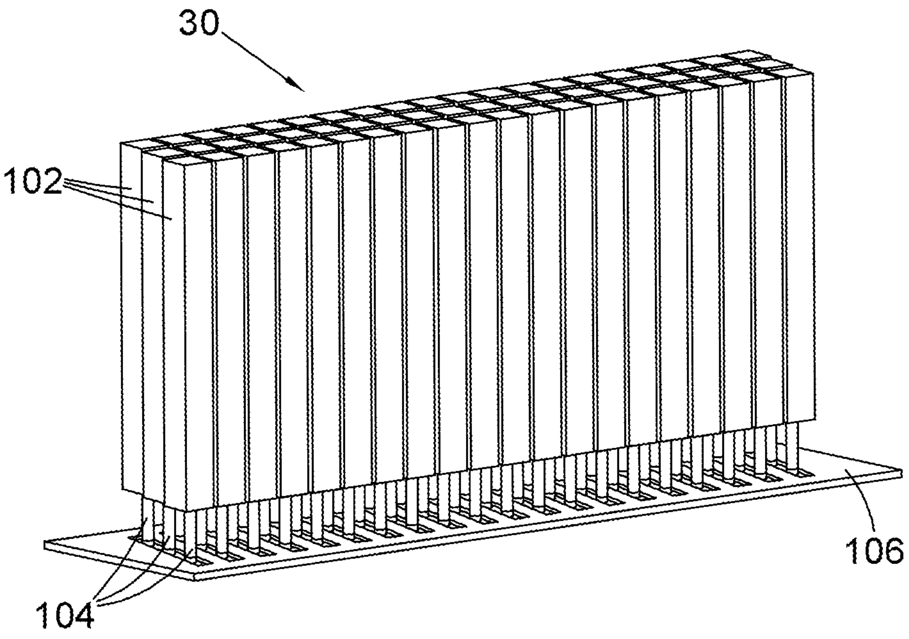

FIG. 2 schematically shows a perspective view of a printhead 30 comprising an array of dispensing elements 10 as described above with reference to FIG. 1. In this exemplary embodiment, the printhead comprises a 3×20 array. However, it will be readily understood that this particular choice of array configuration is not essential. There may be more or fewer pistons in each dimension. Returning to the illustrated embodiment, three pistons are indicated at 104. Each piston has an associated piezoelectric element. Three piezoelectric elements are indicated at 102. The operation of the printhead 30 is the same as that described with respect to FIG. 1 above, however instead of a single piston, three are arranged in a row, and twenty of these rows are stacked next to one another to form an array.

Figure 3:
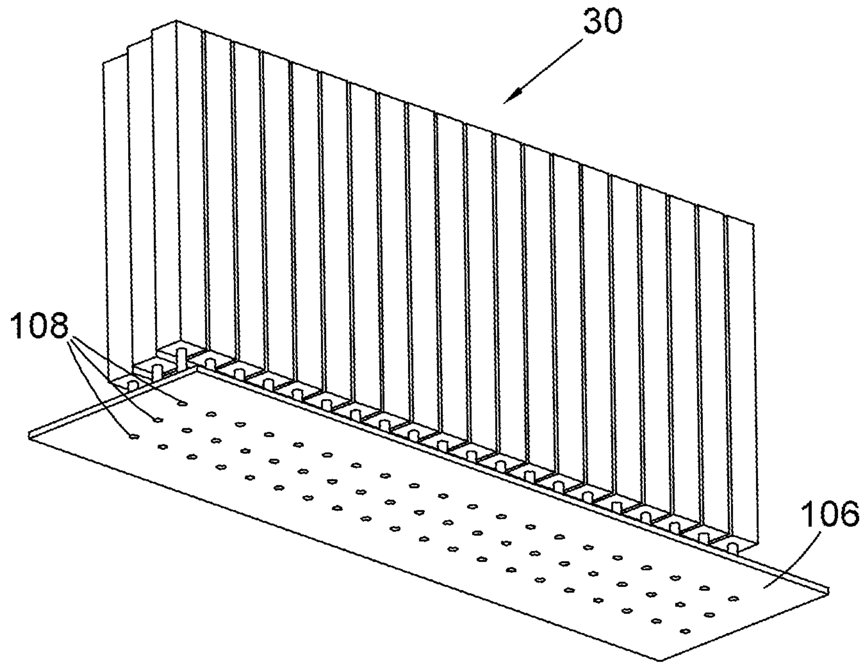

FIG. 3 schematically shows a further view of the printhead 30 shown in FIG. 2. In this view, a plurality of dispensing orifices can be seen in the dispensing plate 106. The position of each dispensing orifice corresponds to the position of a piston suspended above the dispensing plate 106. Three dispensing orifices are indicated at 108.

In each of the above embodiments, the piston is configured to be aligned with the orifice through which the fluid is to be ejected. Alignment of the piston with the orifice ensures consistency of droplet ejection, both in relation to the size of the droplet dispensed and also the direction of dispensing relative to the dispensing plate. It also ensures symmetry of jetting from each orifice.

The actuation of the piezoelectric actuator is achieved by applying a voltage step from 0 to +50V over a period of several microseconds. The printhead may operate at a frequency of approximately 10 kHz. The voltage profile may take the shape of a trapezoidal shape. The use of a voltage pulse profile minimizes the time required to reset the meniscus shape to enable another droplet to be ejected. In some embodiments a trapezoidal pulse is deployed that includes a voltage rise at a higher slew rate than the voltage drop. For example, our voltage rise rate is 50V $msec^{-1}$. Relatively high rates of voltage rise, in the region of 150-10V/ms, enable the jetting principle in operation in the system.

The piezoelectric transducers used are typically stacked piezoelectric transducers with D31 values of around 200×10-12 m/V and a quality factor=100. Based on an actuation drive pulse of ~50 V, we can expect a linear displacement of around 10 nm.

The piezoelectric actuation is typically applied at frequencies 1-100 kHz and most preferably in the range 10-50 kHz. Repeated firing of droplets is necessary for ink jet printing applications and we have observed stable repeated dispensing of droplets at up to 50 kHz using the design disclosed in this application. The majority of the time taken between the dispensing of droplets is the refilling of the relevant part of the fluid flow path. The factors affecting this refilling process are the surface tension of the fluid, the viscosity of the fluid and whether the fluid is Newtonian or non-Newtonian.

Piston-Membrane Component Design

Figure 4:
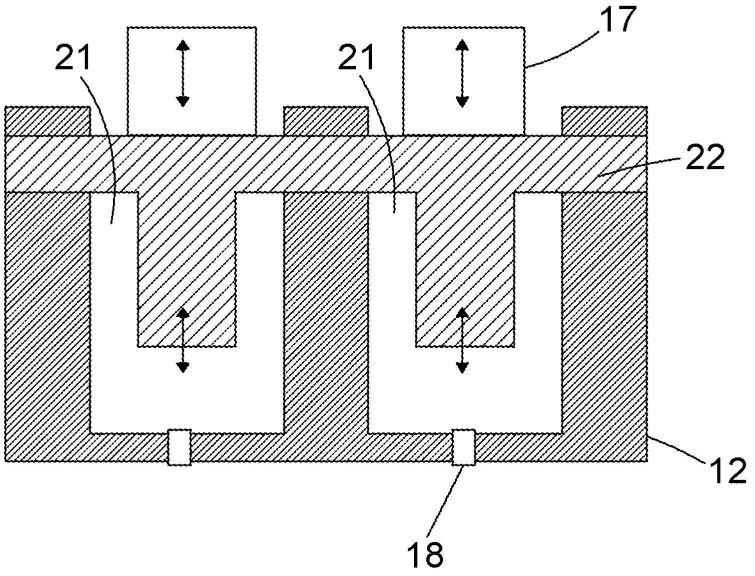
FIG. 4 shows an example of a side view of two dispensing elements incorporating a membrane.

The design of the membrane 22, as illustrated in FIG. 4, is shaped to provide a substantially piston-like geometry, which enables the transfer of mechanical energy from the piezoelectric transducer 17 to the fluid without the requirement for a separate seal. In FIG. 4, the membrane 22 has a cylindrical protrusion 23 that extends perpendicular to the plane of the membrane 22. The dispensing plate 12 is shaped to provide a series of substantially cylindrical wells 21. The wells 21 have a diameter in the region of 1 mm and the cylindrical protrusion 23 has a diameter of about 0.3 mm. This means that the protrusion can move up and down in the well 21 with ease. The membrane 22 illustrated in FIG. 4 is a single homogenous layer. The material selection is based on the requirement for compliance such that a liquid seal can be effectively made. It may be formed, for example, from silicone.

Figure 5:
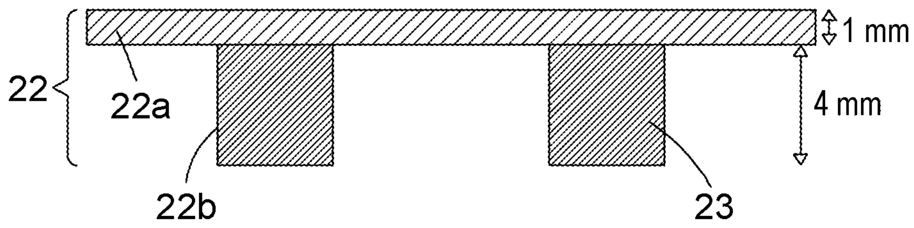
FIG. 5 shows an alternative configuration for the membrane.

FIG. 5 shows a dual layer membrane 22. The two layers may be formed from different materials. The upper layer 22*a* may be formed from a material selected for good sealing properties, such as silicone. The lower layer 22*b* may be formed from a less compressible material in order to ensure that the energy from the piezoelectric transducer 17 is transferred into the fluid 14 rather than being absorbed by the membrane 22. In the illustrated configuration, there is a 5 mm pitch between adjacent dispensing elements. The upper layer of the membrane 22*a* is 1 mm thick and the protrusions 23 are 4 mm high.

Figure 6:
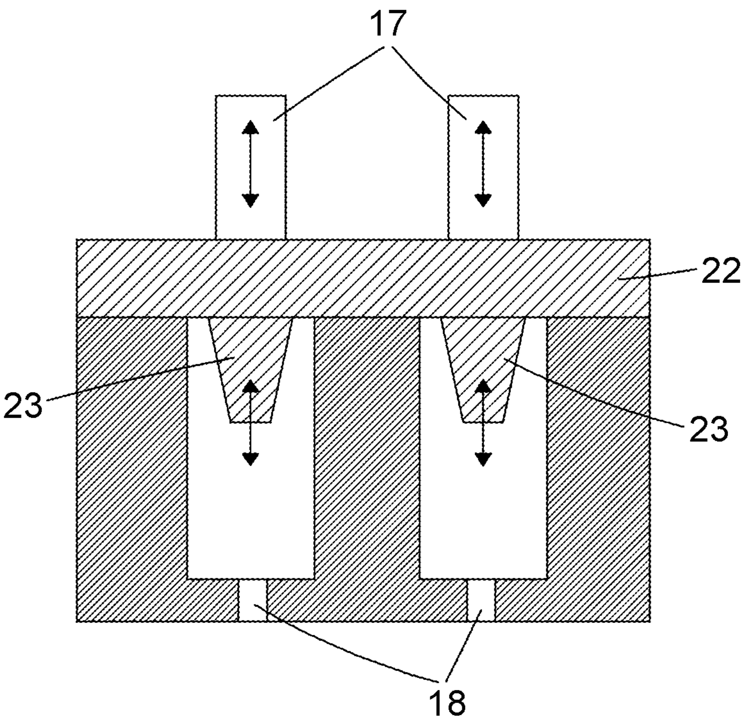
FIG. 6 shows a further alternative configuration for the membrane.

FIG. 6 shows a side view of two dispensing elements 10. The fluid flow path is directed in/out of the page in this view. In this embodiment, the protrusions 23 are tapered. Although the tapered protrusions 23 of the illustrated embodiment are part of a homogenous membrane 22, it would be understood by the skilled man that that the tapered protrusions could also be deployed in the dual layer configuration shown in FIG. 5. A tapered protrusion 23 is easier to manufacture than a constant radius cylinder. Furthermore, the tapered shape may focus the droplet formation.

The reliability of the electrical connections is achieved by separating the fluid containing areas from the non-fluid containing areas with an integrated membrane, which acts to seal the compartments.

In addition, the components used in the dispensing element 10 influence the convenience and cost of manufacture. The printhead 30 formed from an array of dispensing elements 10 can replace several hundred individual pistons with a single component. This has a significant simplifying effect on the manufacture of the overall printhead assembly.

Furthermore, this jetting element design, which deploys a membrane 22 to define one side of the microfluidic flow channel enables more consistent fluid flow to be achieved, in comparison to multi-component assemblies.

Piezoelectric Transducer Component Design

Figure 7:
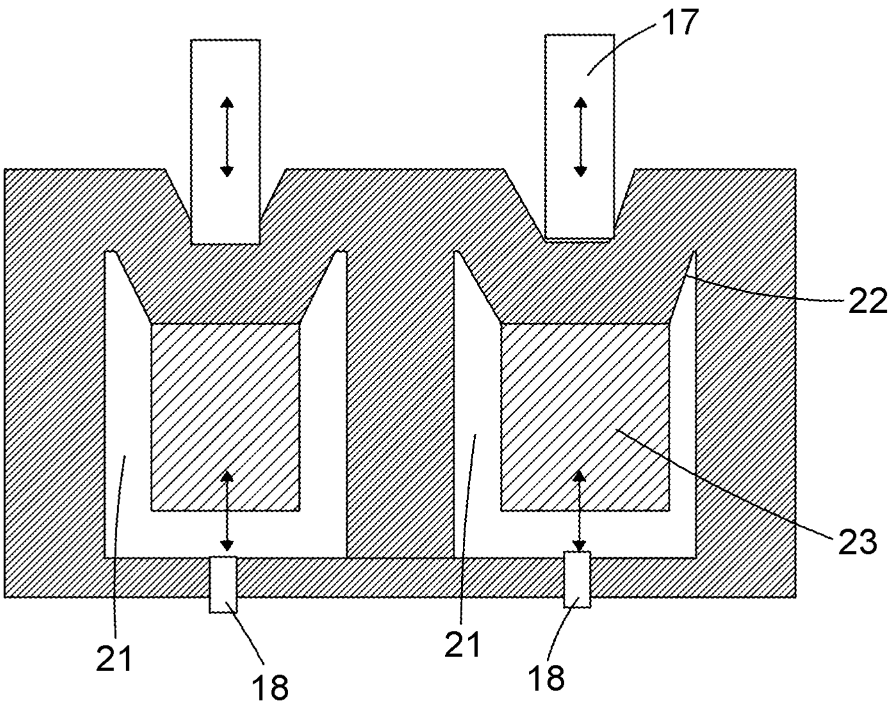
FIGS. 7, 8A and 8B show side views of dispensing elements that have been fabricated by two different techniques.
Figures 8A, 8B:
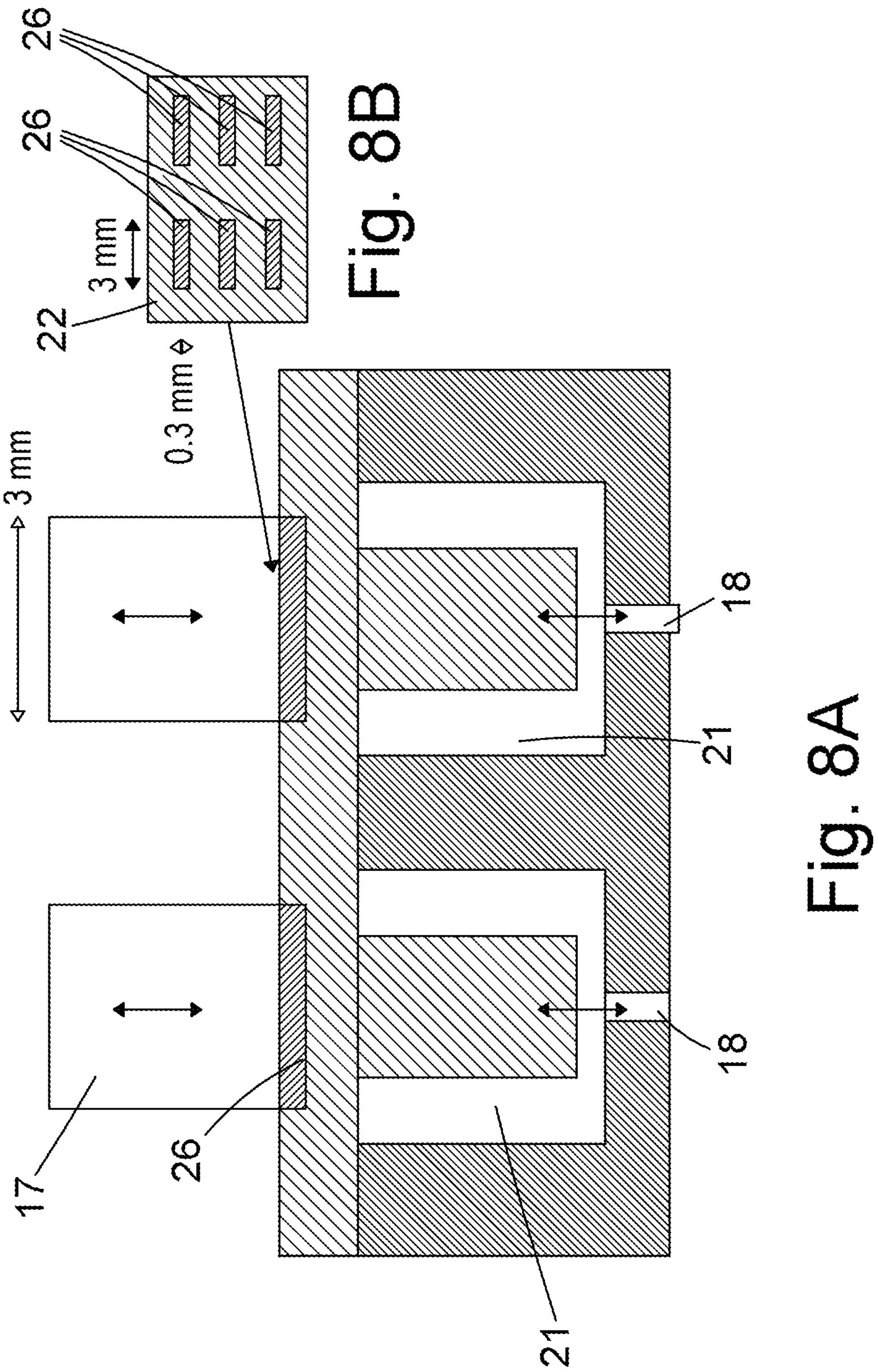

The piezoelectric transducer 17 may be a stacked design which is in direct mechanical contact with and connected to the protrusion 23 of the membrane 22, perpendicular to the electrode-to-electrode axis. A direct mechanical connection is essential to ensure that the mechanical movement of the piezoelectric transducer is transferred to the piston membrane up to frequencies of 100 kHz. Two examples are illustrated in FIG. 7 and FIG. 8A. FIG. 7 shows the membrane 22 being deformed to accommodate the piezoelectric transducer 17. FIG. 8A shows an adhesive bond 26 applied between the piezoelectric transducer 17 and the membrane 22. Although FIGS. 7 and 8 show different joining techniques, it will be understood that, depending on the configuration of the dispensing element, these techniques may be combined with each other and/or with other mechanical interference fitting, not shown in the illustrated embodiments.

FIG. 8B shows a top view of the membrane 22 showing adhesive 26 provided at six locations for bonding six piezoelectric transducers 17. In this example, the piezoelectric transducers are 3 mm×0.3 mm. This shallow transducer 17 enables the printhead 30 to be tightly stacked as the distance between the adjacent wells 21 will be dictated by the diameter of the protrusion, not by the depth of the piezoelectric transducer 17.

Figure 9:
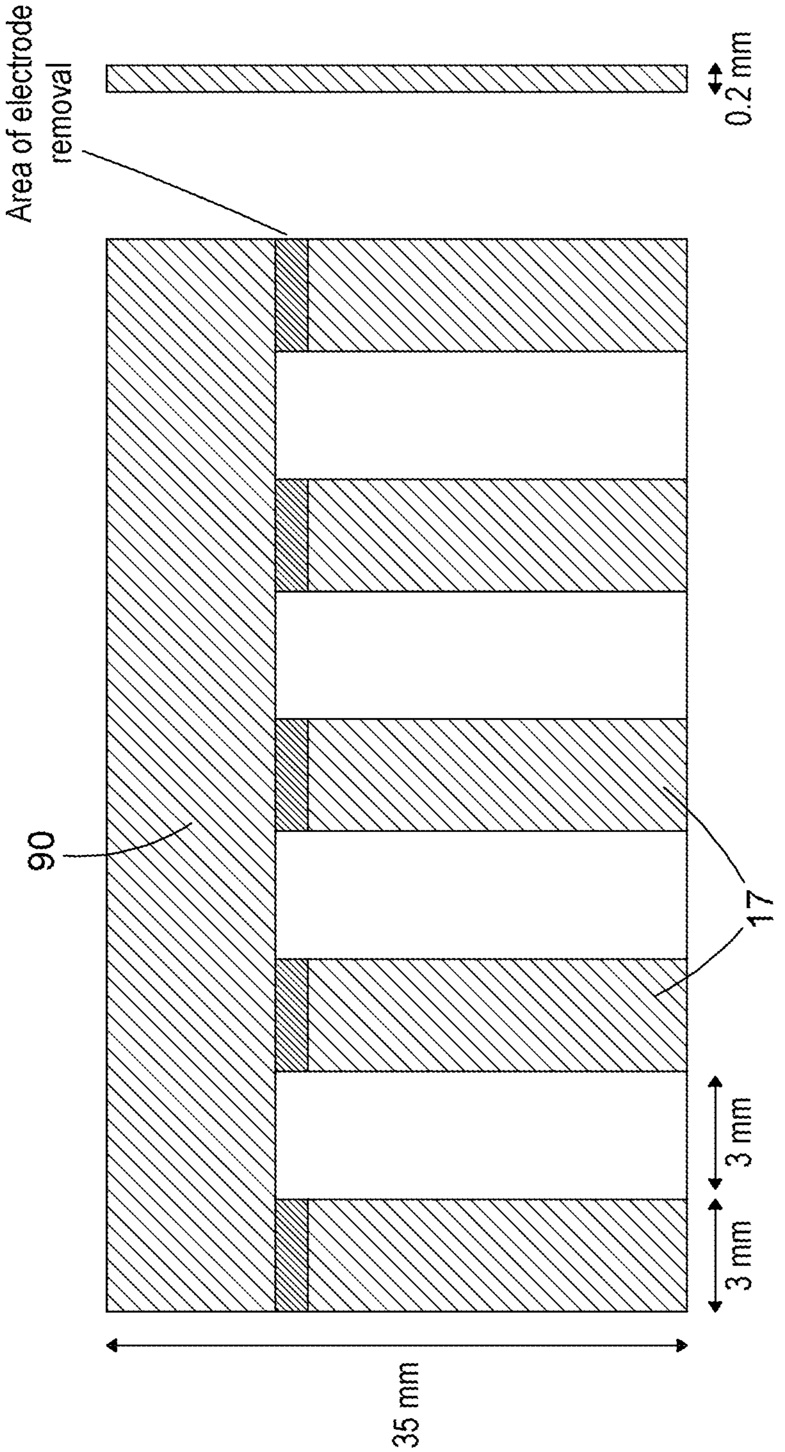
FIG. 9 shows an example of a piezoelectric transducer array which is a single component providing a plurality of piezoelectric transducers.

FIG. 9 shows an example of a piezoelectric transducer array 90 which is a single component providing a plurality of piezoelectric transducers 17. This “comb” configuration consists of several electrically separate and mechanically integrated piezoelectric transducers 17.

Printhead Assembly

Figure 10A:
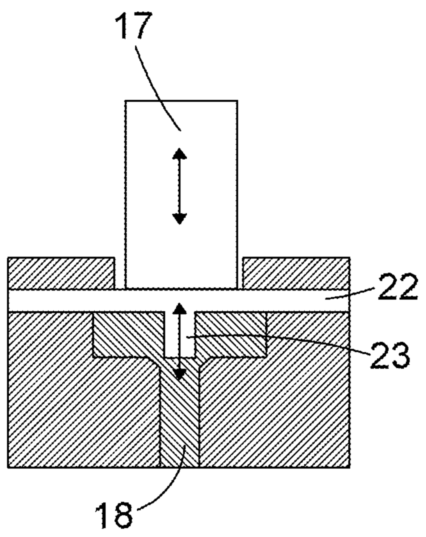
FIGS. 10A, 10B and 10C are side, end and plan views respectively of a printhead.
Figure 10B:
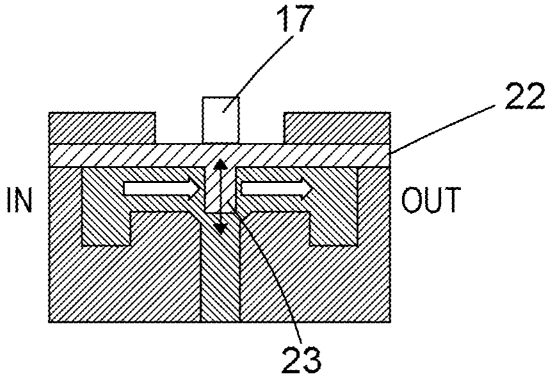
Figure 10C:
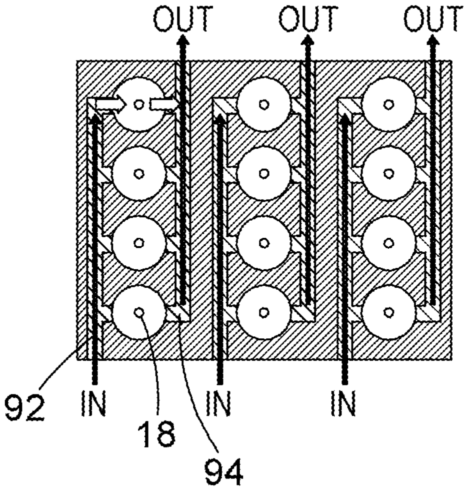

The printhead 30 illustrated in FIGS. 10A, 10B and 10C is based on an array of jetting elements or dispensing elements 10. The construction of an array is necessary in order to provide sufficient native resolution (pitch of jetting elements) to achieve high resolution printing based on a delivering a droplet of ink on demand.

The printhead 30 is most preferably composed of a stack of interlocking layers, best illustrated in the plan view of FIG. 10C. A manifold 92 is provided to introduce fluid into and collect fluid from a single row of dispensing elements 10. Each of the dispensing elements 10 includes a dispense orifice 18; a well 21; a piezoelectric transducer 17 and a membrane 22 configured to provide a seal between the wetted part of the printhead and the fluid-free part, which contains the piezoelectric transducers 17.

As illustrated in FIG. 10B, the piezoelectric transducer 17 is aligned with the protrusion 23 that extends from and forms part of the membrane 22. The piezoelectric transducer 17 is also aligned with the dispensing orifice 18.

In the illustrated embodiments, the printhead 30 utilizes a membrane 22 that includes an array of protrusions 23 that are aligned with the dispenser orifices 18. This serves to align the dispenser orifices 18 with the array of protrusions 23, overcoming the alignment challenges associated with hundreds on separate piston elements.

Fluid Flow Path

The piston jetting system is most preferably configured in an array to create a printhead 30 capable of imaging. Each dispensing orifice 18 is fed with ink from a fluid delivery manifold 92 that performs two key functions:

1. Delivers a continuous flow of ink to maintain suspension of particles and remove air bubbles
2. Maintain consistent meniscus pressure at the dispense orifice The printhead 30 is most preferably configured as shown in FIGS. 10A, 10B and 10C, wherein the dispensing elements 10 are fed from a manifold 92 that is substantially parallel to an outlet manifold 94. This flow path design ensures consistent pressures in the dispensing element 10 based on substantially homogeneous pressures within the inlet 92 and outlet 94 manifolds, since the flow resistance of the manifolds is substantially lower than through the dispensing elements 10. The pressure is, of course higher in the inlet manifold 92 than the outlet manifold 94 to ensure consistent flow through. The flow rate through is most preferably 0.1-0.5 mL min−1 per nozzle.

The membrane 22 forms part of the fluid flow path and acts to seal one side of the microfluidic flow channel. The other side of the channel is formed by the dispensing plate 12. The continuous single component nature of the membrane 22 minimizes any turbulent effects associated with the interface between the piezoelectric transducer 17 and the membrane 22. This enables highly consistent fluid flow to be achieved within the printhead 30.

The above-described embodiments are exemplary only, and other possibilities and alternatives within the scope of the invention will be apparent to those skilled in the art.

The invention claimed is:

1. A liquid dispensing element comprising;

a dispensing plate comprising a plurality of orifices, the dispensing plate at least partially defining a fluid flow path;

an upper plate provided substantially parallel to the dispensing plate, the fluid flow path directly below the upper plate;

a plurality of piezoelectric transducers each comprising a piston configured to move perpendicular to the dispensing plate between a first position wherein the piston is in proximity to the dispensing plate and a second position wherein the piston is spaced apart and further from the dispensing plate, wherein each piston is configured, upon actuation by a piezoelectric component, to move between the first and second positions to create a pressure wave directed at a corresponding orifice of the dispensing plate, and to thereby cause a surface cavitation event in a fluid continuously flowing along the fluid flow path which results in the ejection of a droplet of fluid, the diameter of the droplet being less than a diameter of the orifice.

2. The liquid dispensing element according to claim 1, wherein each piston is configured to contact the fluid flow path when it is in the first position.

3. The liquid dispensing element according to claim 1 wherein, in a first position, the piston is a distance of 50-500 μm from the plane of the dispensing plate.

4. The liquid dispensing element according to claim 1 wherein the second position of the piston is 5 nm-1 μm from the first position of the piston.

5. The liquid dispensing element according to claim 1 wherein the piezoelectric transducer is configured to move the piston at a speed of 10-2 to 10-4 ms-1.

6. The liquid dispensing element according to claim 1, wherein each piston is tapered.

7. The liquid dispensing element according to claim 1, wherein the orifices have a diameter in the range of 25 μm and 150 μm.

8. The liquid dispensing element according to claim 1, wherein the upper plate comprises a plurality of orifices through which the pistons are configured to pass.

9. The liquid dispensing element according to claim 1, wherein the upper plate is formed from an elastomeric material.

10. The liquid dispensing element according to claim 9, wherein the elastomeric material has a thickness in the region of 50 μm to 300 μm.

11. The liquid dispensing element according to claim 1, further comprising a seal between each orifice and the corresponding piston.

12. A printhead comprising an array of liquid dispensing elements according to claim 1.

13. The printhead according to claim 12, wherein the upper plate seals the fluid flow path from the piezoelectric transducers.

14. The printhead according to claim 12, wherein the upper plate has a series of protrusions configured to engage with the pistons.

15. The printhead according to claim 12, wherein the upper plate has a dual-layered construction.

* * * * *